(12) United States Patent  
Caron

(10) Patent No.: US 8,294,808 B2  
(45) Date of Patent: Oct. 23, 2012

(54) DUAL FIELD-OF-VIEW OPTICAL IMAGING SYSTEM WITH DUAL FOCUS LENS

(75) Inventor: Hubert Caron, Quebec (CA); Monique Gauthier, legal representative, Quebec (CA)

(73) Assignee: Thales Canada Inc., Saint-Laurent, Quebec (CA)

( * ) Notice: Subject to any disclaimer, the term of this patent is extended or adjusted under 35 U.S.C. 154(b) by 226 days.

(21) Appl. No.: 12/708,888

(22) Filed: Feb. 19, 2010

(65) Prior Publication Data

US 2010/0214468 A1   Aug. 26, 2010

Related U.S. Application Data

(60) Provisional application No. 61/154,182, filed on Feb. 20, 2009.

(51) Int. Cl.  
*H04N 5/225* (2006.01)

(52) U.S. Cl. .................................................. 348/344

(58) Field of Classification Search ............... 348/335, 348/348, 219.1, 343, 344; 359/19, 351, 654, 359/721, 722, 726, 729  
See application file for complete search history.

(56) References Cited

U.S. PATENT DOCUMENTS

| | | | |
|---|---|---|---|
| 4,354,742 A | 10/1982 | Abel et al. | |
| 5,051,830 A * | 9/1991 | von Hoessle | 348/335 |
| 5,161,051 A | 11/1992 | Whitney et al. | |
| 5,565,668 A | 10/1996 | Reddersen et al. | |
| 5,986,779 A | 11/1999 | Tanaka et al. | |
| 6,870,690 B1 | 3/2005 | Lawson et al. | |
| 7,573,654 B2 * | 8/2009 | Bietry et al. | 359/726 |
| 7,764,440 B2 * | 7/2010 | Border et al. | 359/721 |
| 2004/0218083 A1 * | 11/2004 | Thompson et al. | 348/335 |
| 2005/0068453 A1 * | 3/2005 | Sasakura | 348/335 |
| 2006/0209195 A1 * | 9/2006 | Goto | 348/219.1 |
| 2007/0279535 A1 * | 12/2007 | Fiolka | 348/744 |
| 2008/0239088 A1 * | 10/2008 | Yamashita | 348/222.1 |
| 2008/0309914 A1 * | 12/2008 | Cantin et al. | 356/4.01 |
| 2009/0168190 A1 * | 7/2009 | Imaoka et al. | 359/654 |
| 2010/0091386 A1 * | 4/2010 | Deng et al. | 359/773 |

* cited by examiner

*Primary Examiner* — Tuan Ho  
(74) *Attorney, Agent, or Firm* — Ladas & Parry LLP

(57) ABSTRACT

A dual field-of-view optical imaging system is provided for obtaining two images of a scene, each image having a different field of view. The dual field-of-view optical imaging system includes a frontal dual focus lens, the dual focus lens having a central zone of focal length $f_1$ producing a wide field-of-view image at a first focal plane and a peripheral zone of focal length $f_2$ greater than $f_1$ producing a narrow field-of-view image at a second focal plane; and a detector for detecting and acquiring the wide field-of-view image and the narrow field-of-view image, the detector being movable along an optical path for selective positioning at the first focal plane or the second focal plane.

12 Claims, 5 Drawing Sheets

DUAL FIELD-OF-VIEW OPTICAL IMAGING SYSTEM WITH DUAL FOCUS LENS

This claims the benefit of U.S. Provisional Application No. 61/154,182 filed Feb. 20, 2009 and incorporates the same by reference.

FIELD OF THE INVENTION

The present invention relates to the field of optical systems. More particularly, the present invention concerns an optical imaging system providing dual field of view using a dual focal lens and moving detector.

BACKGROUND OF THE INVENTION

A principal application for optical imaging systems is the detection, recognition, and identification (DRI) of objects.

Hence, an often-encountered requirement of these optical systems is that they be able to provide an image of a scene having a wide field of view (WFOV) and low magnification and another image of the scene having a narrow field of view (NFOV) and relatively higher magnification, thus forming a dual field of view optics, for example with a magnification ratio of at least three times between fields of view.

Optical imaging systems that respect this requirement often use complex multiple component systems. Generally, one lens or system of lenses is used to provide the WFOV image of the scene while another lens or systems of lenses is used to provide the NFOV image. There exist optical systems where one basic set of lenses common to both the WFOV and NFOV image acquisition is used in conjunction with additional field-of-view-specific lenses to acquire the specific field of view image. In such optical systems, the additional lenses are selectively inserted into the optical path to select the desired field of view (FOV). The selection mechanism of such systems can be voluminous adding to the overall size of the optical imaging system. As the number of optical components of an optical system increases, the adjustment of the components becomes more complicated and the overall weight and size of the system tends to increase.

In order to separately view the two images of different fields of view that are formed, optical imaging systems include a detector onto which the image is focussed.

In some prior art systems, each of the two images of different fields of view is assigned a separate location on the detector using additional optical components such as prisms or filters to redirect or shift one or both of the images onto the detector. However, with this approach to image detection, the quality and to resolution of each of the images is less than optimal since only a portion of the total pixels of the detector are actually used for each of the images.

In other prior art systems, elements of the lens system are moved along the optical path to a position where one image of the scene is focussed onto the entire surface of the fixed detector and are then moved along the optical path to another position where the other image is now focussed onto the entire surface of the fixed detector. It is also known to use two different detectors to image a scene with two different fields of view. Of course, this latter method can make for a more expensive and more voluminous system.

There is therefore a need for an optical imaging system, which reduces the number of optical components and provides two images of a scene, each having a different field of view, by using the entire active surface of a detector.

SUMMARY OF THE INVENTION

In accordance with an aspect of the present invention, there is therefore provided a dual field-of-view optical imaging system for obtaining two images of a scene, each image having a different field of view. The dual field-of-view optical imaging system includes:

a frontal dual focus lens, the dual focus lens having a central zone of focal length $f_1$ producing a wide field-of-view image at a first focal plane and a peripheral zone of focal length $f_2$ greater than $f_1$ producing a narrow field-of-view image at a second focal plane; and a detector for detecting and acquiring the wide field-of-view image and the narrow field-of-view image, the detector being movable along an optical path for selective positioning at the first focal plane or the second focal plane.

The frontal dual focus lens is preferably fixed in position and of unitary construction, i.e. a single-piece lens.

The dual field-of-view optical imaging system may further include a field corrector for correcting field-of-view aberrations, the field corrector being positioned along is the optical path between the frontal dual focus lens and the detector. The field corrector preferably includes a single lens for correcting aberrations for both the wide and narrow fields of view, the single lens field corrector moving in tandem with the detector. In accordance with another embodiment, the field corrector may include more than one lens, each lens tailored to correcting specific field-of-view aberrations and being accordingly positioned.

Screens, for example hoods or movable baffles, may be used to block parasitic light.

In accordance with another aspect of the present invention, there is provided a method of acquiring two images of a scene, each image having a different field of view. The method includes providing a dual field-of-view imaging optical system as described hereinabove, moving the detector to the first focal plane 18 and acquiring the WFOV image, and moving the detector to the second focal plane 20 and acquiring the NFOV image. The method may further include providing screens and blocking parasitic light using these screens. The method may also include performing an offset correction for spatial noise.

Other features and advantages of the present invention will be better understood upon reading of the description herein below with reference to the appended drawings.

DESCRIPTION OF THE INVENTION

The aspects of the present invention will be described more fully hereinafter with reference to the accompanying drawings, FIGS. 1 to 5.

The present invention aims to provide a dual field-of-view optical imaging system 10 that can be used to obtain two images of a scene under view: one image of a wide field of view (WFOV) of the scene and another image of a narrow field of view (NFOV) of the scene with a relatively higher magnification.

Figure 2:
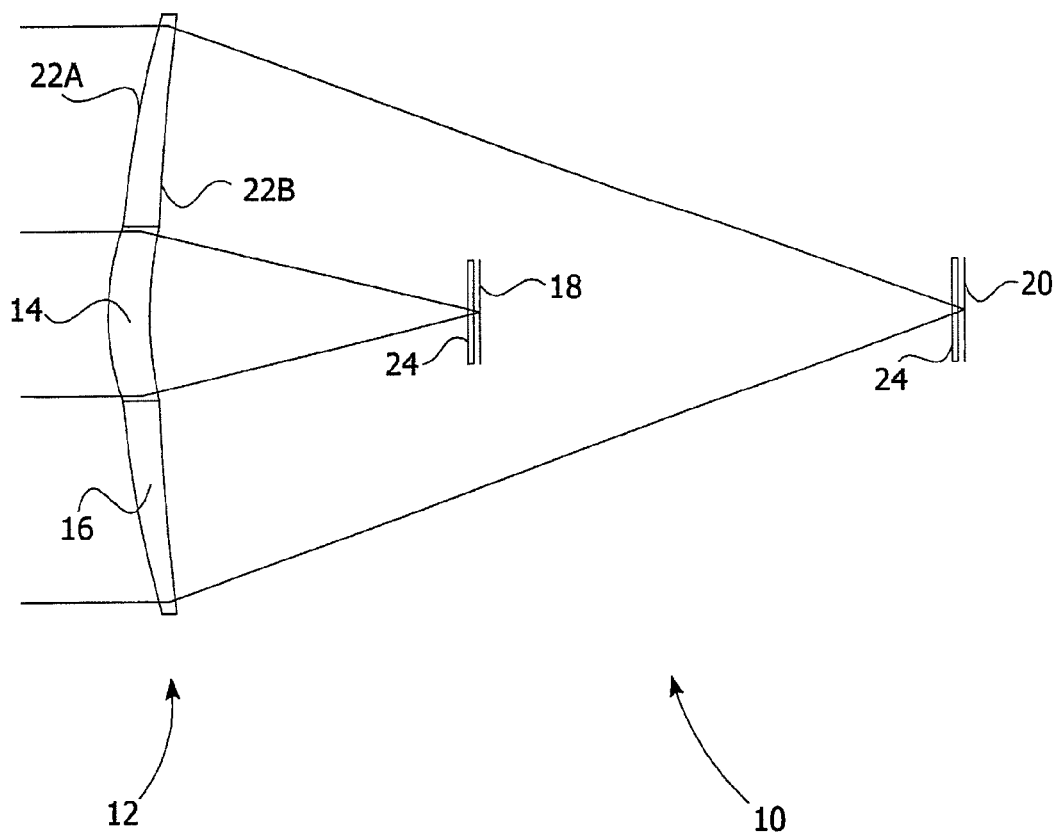
FIG. 2 is a schematic ray trace diagram of a dual field-of-view optical imaging system according to an embodiment of the present invention.
Figure 3:
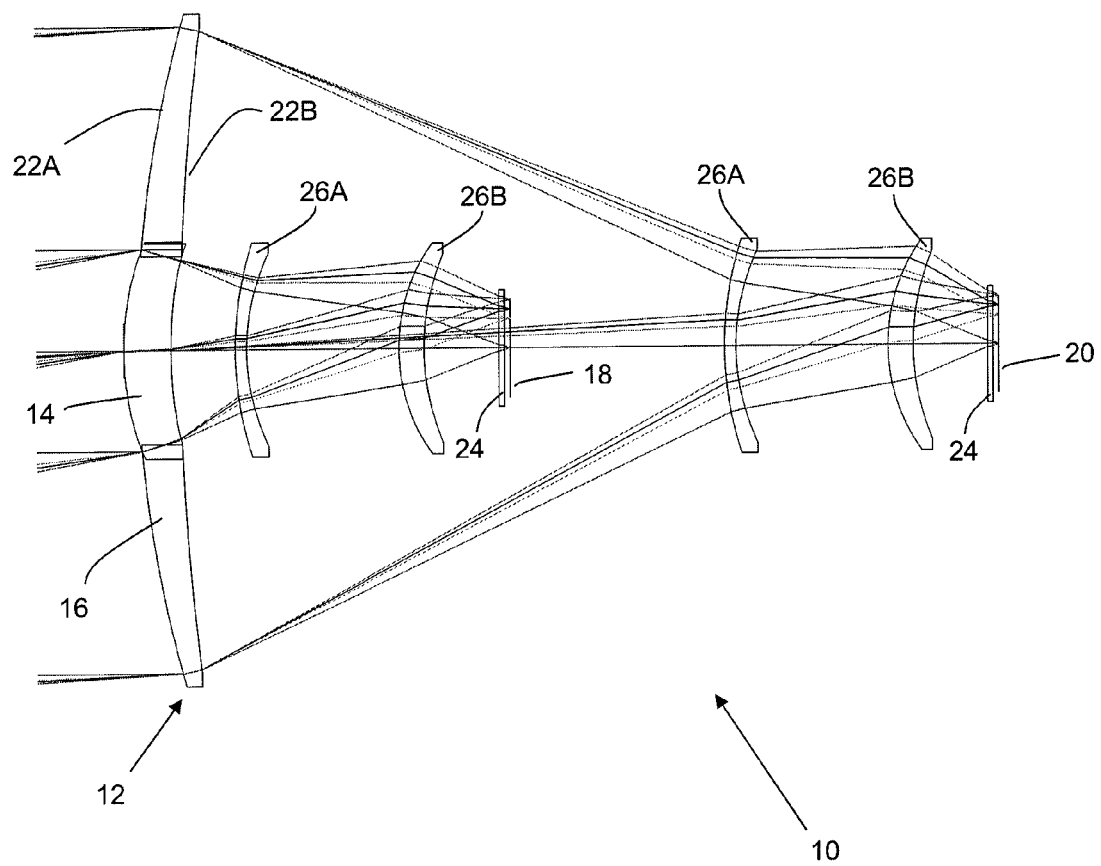
FIG. 3 is a schematic ray trace diagram of a dual field-of-view optical imaging system according to another embodiment of the present invention.

To produce these two images, the dual field-of-view optical imaging system 10 includes a frontal dual focus lens and a detector, as illustrated in FIG. 2.

Figure 1:
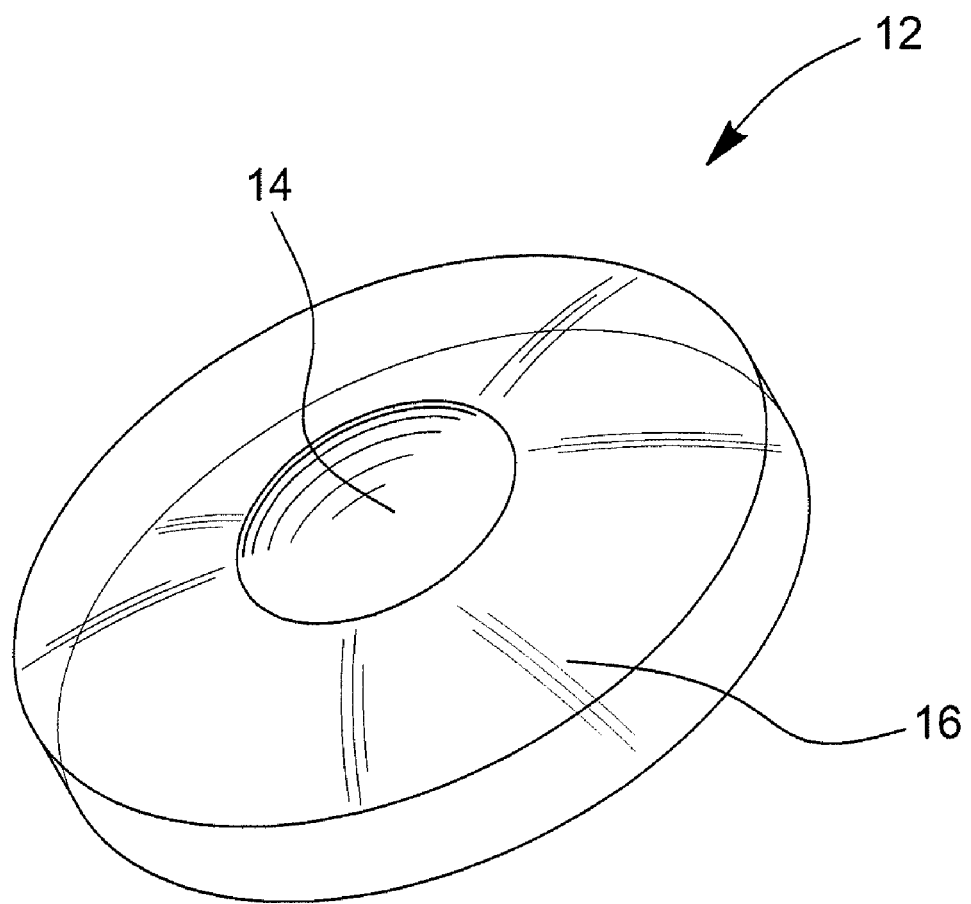
FIG. 1 is a schematic diagram of a frontal dual focus lens according to an embodiment of the present invention, showing a central zone of focal length $f_1$ and a peripheral zone of focal length $f_2$.

An embodiment of the frontal dual focus lens 12 is shown in FIG. 1. Referring to FIGS. 2 to 5, light arriving from the scene under view enters the front of the optical imaging system 10 and impinges on the dual focus lens 12. The dual focus lens 12 is a positive, converging, lens that has a central zone 14 of focal length $f_1$ that produces a wide field-of-view image of the scene at a first focal plane 18 and a peripheral zone 16 of focal length $f_2$ greater than $f_1$ that produces a narrow field-of-view image of the scene at a second focal plane 20 behind the first focal plane 18.

Unlike prior art systems which use one optical element to obtain one field-of-view is image and another optical element to obtain the other field-of-view image, the dual focus lens 12 of the present optical imaging system 10 is advantageously of unitary construction. Preferably, the dual focus lens 12 is a single-piece lens, for example fabricated by moulding or by turning using a computer-controlled lathe—the former being more inexpensive while the latter having a better performance. Alternatively, the dual focus lens 12 may be made of two appropriate lens portions that are combined together, preferably in a leak-tight configuration, to form the dual focus lens 12. For example, a first lens portion used to form the central zone 14 may be inserted and fused to the cut-out center of a second lens portion used to form the peripheral zone 16. According to another embodiment, a first lens portion may be placed over and fused to the center of a second lens portion; the combined lens power at the center providing the WFOV central zone 14 of the dual focus lens 12 and the outer region providing the NFOV peripheral zone 16 of the dual focus lens 12.

Of course, the dual focus lens 12 is not limited to the embodiments described above and may be fabricated using any appropriate means.

Figure 4:
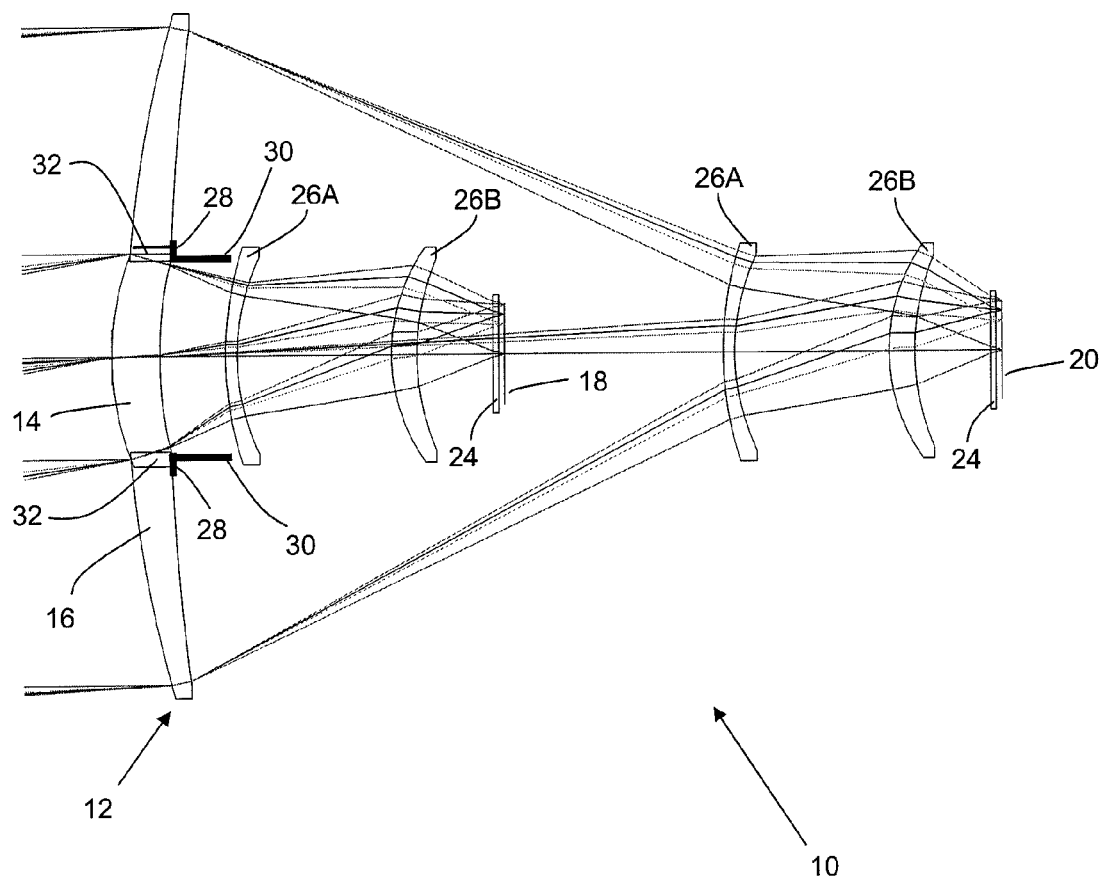
FIG. 4 is a schematic ray trace diagram of a dual field-of-view optical imaging system according to another embodiment of the present invention, showing the use of a baffle and hood to block out parasitic light.
Figure 5:
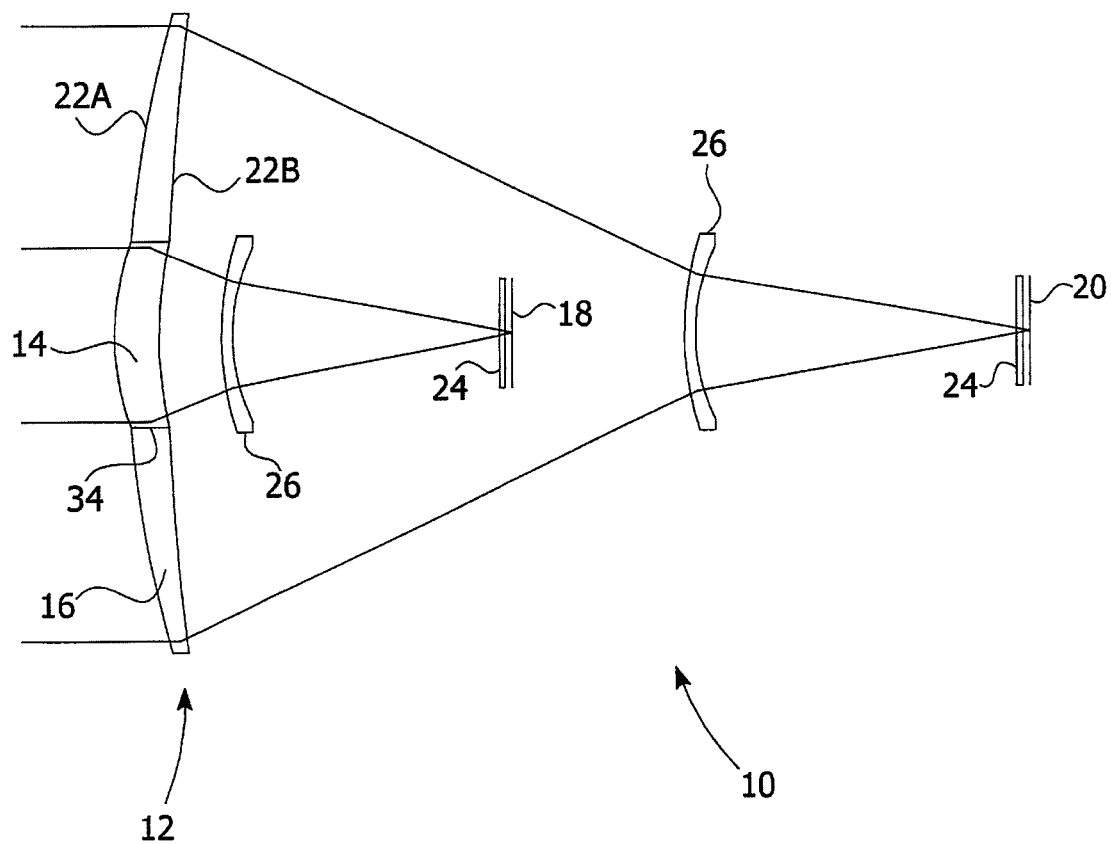
FIG. 5 is a schematic ray trace diagram of a dual field-of-view optical imaging system according to yet another embodiment of the present invention.

The outer surface 22A of the dual focus lens 12 may exhibit a dual radius of curvature or be aspheric consistent with the dual focus nature of the lens or it may be smooth exhibiting a single radius of curvature belying the dual focus nature of the lens—the former having the advantage of ease of design and manufacture. In the case where the outer surface 22A exhibits a single radius of curvature, the inner surface 22B may have a profile tailored to providing the dual focus characteristic of the dual focus lens 12. Advantageously, the inner surface 22B may have a profile tailored to correcting optical aberrations, e.g. spherical or chromatic aberration. The outer surface 22A and/or inner surface 22B may further include an anti-reflective coating. The transition between the central zone 14 and the peripheral zone 16 may occur abruptly, for example at an interface 34 as seen in FIG. 5, or gradually over a transition zone 32, for example as best seen in FIG. 4. It should be noted that the boundary between the central zone and the peripheral zone may not be distinguishable with the naked eye and that the delineation illustrated in FIG. 1 is included for the sake of indicating the two zones.

Moreover, the dual focus lens 12 may be made of any appropriate material transparent to the light arriving from the scene under view. Of course, the choice of material is dependent on the wavelength of the light to be imaged. It may be made of a crystalline or amorphous material. For example, it may be made of germanium (Ge), silicon (Si), zinc selenide (ZnSe), sapphire, silica glass, etc. For imaging light in the visible to shortwave infrared (SWIR) regions of the electromagnetic spectrum (say from 0.5 μm to 3 μm), the dual focus lens may be made from silica glass whereas for imaging light in the mediumwave and longwave infrared (MWIR and LWIR) regions of the electromagnetic spectrum (say from 3 μm to 14 μm), the dual focus lens may be made of germanium.

As mentioned, a detector 24 for detecting and acquiring the two field-of-view images is included in the dual field-of-view optical imaging system 10. The choice of detector 24 can vary dependent on the application, range of electromagnetic spectrum under view and cost. For example, a detector based on photon detection—such as a CCD (charge coupled device), photoconductor or photovoltaic detector—or thermal detection—such as a bolometer which measures electric resistance changes with temperature—may be used. Images produced by photon detectors versus those produced by thermal detectors tend to be of higher quality. For even higher quality images, the sensitivity of the photon detectors may be increased by cryogenically cooling the detectors. However, cooled detectors are generally bulkier and more expensive, both to buy and to operate.

Referring to FIGS. 2 to 5, the detector 24 is aligned with the dual focus lens 12 is along a common optical axis. However, unlike the frontal dual focus lens 12, the detector 24 is selectively movable along the optical axis of the optical imaging system 10. The detector 24 is moved to a position at or near the first focal plane 18 to acquire the WFOV image and moved at or near the second focal plane 20 to acquire the NFOV image. (It should be noted that FIGS. 2 to 5 each illustrate the two possible positions of the detector and do not imply the use of two detectors.) Advantageously, the mechanism used to move the detector 22 is the same mechanism used to provide fine focus adjustment of the images. In accordance with one embodiment, the mechanism comprises a single simple threaded screw mechanism used to move the detector axially.

To correct for any field-of-view aberrations (for example, aspheric or chromatic aberrations) of the dual focus lens 12 and hence limit image distortion, a field corrector 26 may be positioned along the optical axis of the system between the frontal dual focus lens 12 and the detector 24.

The field corrector 26 preferably includes a single lens which may be used to correct aberrations for both the wide and narrow fields of view, as seen in the embodiment of the system illustrated in FIG. 5. As such, the single lens field corrector 26 may be made to move in tandem with the detector 24. In accordance with another embodiment of the system illustrated in FIGS. 3 to 4, the field corrector 26 may include more than one lens, where each lens 26A and 26B is tailored to correcting specific field-of-view aberrations and is accordingly positioned to move in tandem with the detector 24. In this latter embodiment, the field corrector lenses are designed such that in WFOV mode, the detector 24 looks through the field collector lenses. While the frontal dual focus lens 12 is made of germanium, the field corrector lens and/or lenses are generally smaller and may be made of relatively inexpensive amorphous materials.

Parasitic light can be a problem when acquiring the two images: WFOV and NFOV images. Parasitic light coming from the zone of the dual focus lens not involved in producing the image in question can form extraneous unwanted ghost images. For example, parasitic stray light coming from the central zone 14 of the dual focus lens 12 when trying to acquire a NFOV image using the peripheral zone 16 of the dual focus lens 12 can result in transient ghost images which can affect image quality. Screens, for example hoods or movable baffles, may be strategically used to block stray parasitic light and prevent ghost image formation.

As can be seen in the embodiment of the optical imaging system illustrated in FIG. 4, one option is to add baffles 28 and hoods 30 at the frontal dual-focus lens 12. The baffles may be placed to cover/screen the transition zone 32 to prevent parasitic light coming from the transition zone from being imaged. Of course, any appropriate screen or combination of screens may be used to minimise the effects of parasitic light.

The optical imaging system of the present invention may be used in any application requiring dual field of view and has the advantage of minimising the number of optical elements required and simplifying the acquisition of images of the two fields of view.

Through appropriate design of the dual-focus lens and appropriate choice of detector, the optical imaging system of the present invention may be used, for example, for thermal or infrared (IR) imaging. IR imaging is used to detect infrared radiation, that portion of the electromagnetic spectrum situated in the range from 700 nm (0.7 μm) to 14 000 nm (14 μm). Since IR radiation is emitted by all objects according to the blackbody radiation principle, IR imaging is used to detect objects to through the IR radiation that they emit. In accordance with an exemplary, non-limitative, embodiment of the optical imaging system used for IR imaging, preferably in the longwave-IR region between 8 μm and 14 μm, the dual-focus lens may have a WFOV central zone 14 of focal length 49 mm, a NFOV peripheral zone 16 of focal length 148 mm, and a diameter (i.e. overall aperture) of 112 mm. It is possible to get a good quality NFOV and WFOV image of an object as close as 10 m (i.e. a close focus of 10 m is possible for both NFOV and WFOV).

In accordance with another aspect of the present invention, there is provided a method of acquiring two images of a scene, each image having a different field of view: a NFOV and a WFOV. The method includes: providing a dual field-of-view imaging optical system which includes a frontal dual focus lens 12 having a central zone of focal length $f_1$ for producing a wide field-of-view image at a first focal plane and a peripheral zone of focal length $f_2$ greater than $f_1$ for producing a narrow field-of-view image at a second focal plane, a detector 24 and a field corrector as described hereinabove; moving the detector to the first focal plane 18 and acquiring the WFOV image; and moving the detector to the second focal plane 20 and acquiring the NFOV image. The detector can be moved from one focal plane to the other using a screw drive mechanism. The position of the detector is fine tuned to focus the image. Advantageously, the fine adjustment of the position of the detector may be done using the same screw drive mechanism. To improve the quality of the images and limit ghost images, the method may also include providing screens and blocking parasitic light using these screens. The method may further include performing an offset correction to correct for spatial noise in the images. Spatial noise is due to the fact that each pixel of the detector generally does not respond identically. Spatial noise can give a grainy aspect to the raw image. Advantageously, the method may include correcting for the different response of each pixel by "zeroing" each pixel. This may be done by illuminating the detector uniformly by severely defocussing the optical system, obtaining a reference image and subtracting out the reference image from the raw image.

The optical imaging system of the present invention therefore offers optical simplification in terms of the number of optical elements (i.e. lenses) while providing low distortion in both fields of view.

Numerous modifications could be made to any of the embodiments described above without departing from the scope of the present invention.

The invention claimed is:

1. A dual field of view optical imaging system, comprising:
   a dual field of view lens with a magnification ratio of at least three between a wide field of view and a narrow field of view, said lens having a central zone of focal length f1 and a peripheral zone of focal length f2, where f2 is at least three times greater than f1, wherein said central zone is adapted to produce a wide field of view image and said peripheral zone is adapted to produce a narrow field of view image; and
   a movable detector for detecting and acquiring two field of view images, said detector being aligned with said lens along a common optical axis, said detector being axially movable between a first position corresponding to said focal length f1 and a second position corresponding to said focal length f2.

2. An imaging system according to claim 1, wherein said lens is a single piece lens.

3. An imaging system according to claim 1, wherein said lens is made of two lens portions that are combined together.

4. An imaging system according to claim 1, wherein said lens has an outer surface that has a dual radius of curvature.

5. An imaging system according to claim 1, wherein said lens has an outer surface that is aspheric.

6. An imaging system according to claim 1, wherein said lens has an inner surface that is tailored for correcting optical aberrations.

7. An imaging system according to claim 1, wherein said lens has an outer surface and an inner surface, and wherein said inner surface, or said outer surface or both is provided with an anti-reflective coating.

8. An imaging system according to claim 1, wherein said lens is made of a material that is transparent to a range of wavelengths of the light of a scene under view.

9. An imaging system according to claim 1, wherein said detector is a photon-based detector or a thermal-based detector.

10. An imaging system according to claim 1 further comprising a field corrector placed between said lens and said detector.

11. An imaging system according to claim 1, wherein said imaging system further includes screen to block parasitic light.

12. A method of acquiring two images of a scene, a first image having a wide field of view and a second image having a narrow field of view, comprising the steps of:
   (a) providing a dual field of view lens having a central zone of focal length f1 for producing a wide field of view image at a first focal plane and a peripheral zone of focal length f2 for producing a narrow field of view image at a second focal plane; and
   (b) providing a movable detector, said detector being aligned with a common optical axis with said dual field of view lens, said detector being movable between said focal lengths f1 and f2.

* * * * *